US010591167B2

(12) United States Patent
Johnson et al.

(10) Patent No.: US 10,591,167 B2
(45) Date of Patent: Mar. 17, 2020

(54) COOKTOP APPLIANCE CONTROL SYSTEM

(71) Applicant: General Electric Company, Schenectady, NY (US)

(72) Inventors: Eric Scott Johnson, Louisville, KY (US); Jeremy Davidson Mahaney, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 642 days.

(21) Appl. No.: 14/924,900

(22) Filed: Oct. 28, 2015

(65) Prior Publication Data

US 2017/0122569 A1 May 4, 2017

(51) Int. Cl.
| | | |
|---|---|---|
| H05B 3/68 | (2006.01) | |
| F24C 7/08 | (2006.01) | |
| H05B 1/02 | (2006.01) | |
| H04L 12/28 | (2006.01) | |
| H04W 4/38 | (2018.01) | |
| H05B 3/74 | (2006.01) | |
| H05B 6/06 | (2006.01) | |
| H04L 12/46 | (2006.01) | |
| H04W 4/70 | (2018.01) | |

(52) U.S. Cl.
CPC .......... *F24C 7/083* (2013.01); *H04L 12/2827* (2013.01); *H04L 12/4625* (2013.01); *H04W 4/38* (2018.02); *H04W 4/70* (2018.02); *H05B 1/0266* (2013.01); *H05B 3/74* (2013.01); *H05B 6/062* (2013.01)

(58) Field of Classification Search
CPC .. F24C 7/083; H04L 12/2827; H04L 12/4625; H04W 4/04; H04W 4/70; H05B 1/0266; H05B 3/74; H05B 6/062
USPC ............................ 219/443.1–468.2, 490–518
See application file for complete search history.

(56) References Cited

U.S. PATENT DOCUMENTS

| | | | | |
|---|---|---|---|---|
| 3,786,220 | A * | 1/1974 | Harnden, Jr. | ......... F24C 15/105 |
| | | | | 219/622 |
| 4,399,351 | A * | 8/1983 | Koff | ...................... A47J 27/004 |
| | | | | 219/430 |
| 5,746,114 | A | 5/1998 | Harris | |
| 6,225,608 | B1 * | 5/2001 | Kallgren | ................ H05B 3/265 |
| | | | | 219/465.1 |
| 6,320,169 | B1 * | 11/2001 | Clothier | ................. H05B 6/062 |
| | | | | 219/620 |
| 9,109,960 | B2 * | 8/2015 | Sladecek | .................. G01K 7/42 |
| 2006/0081607 | A1 * | 4/2006 | Niiyama | ................ H05B 6/062 |
| | | | | 219/497 |

(Continued)

*Primary Examiner* — Sang Y Paik
(74) *Attorney, Agent, or Firm* — Dority & Manning, P.A.

(57) ABSTRACT

A method for operating a cooktop appliance is provided. The method includes determining a temperature of a cooking utensil positioned on a heating element of the cooktop appliance, as well as determining a temperature of a food in the utensil positioned on the heating element of the cooktop appliance. The method also includes calculating a temperature differential between the temperatures of the food in the cooking utensil and of the cooking utensil itself. Subsequently, the method includes controlling a heating temperature of the heating element to reduce the temperature differential when the temperature differential is greater than a predetermined threshold to, e.g., reduce a risk of burning a portion of the food in the utensil.

19 Claims, 4 Drawing Sheets

(56) References Cited

U.S. PATENT DOCUMENTS

2008/0110875 A1\* 5/2008 Fisher ................... F24C 7/082
                                                                                            219/483
2011/0284524 A1\* 11/2011 Okuda ................... H05B 6/062
                                                                                            219/622

\* cited by examiner

COOKTOP APPLIANCE CONTROL SYSTEM

FIELD OF THE INVENTION

The present subject matter relates generally to cooktop appliances, or more particularly to methods for operating cooktop appliances.

BACKGROUND OF THE INVENTION

Cooktop appliances generally include heating elements for heating cooking utensils, such as pots, pans and griddles. A user can select a desired heating level, and operation of the heating elements is modified to match the desired heating level. For example, certain cooktop appliances include electric heating elements. During operation, the cooktop appliance operates the electric heating elements at a predetermined power output corresponding to a selected heating level.

Operating the electric heating elements at the predetermined power output corresponding to the selected heating level poses certain challenges. For example, such a method of operation may create an undesirable temperature differential between a temperature of the cooking utensil being heated by the heating element and a temperature of one or more food items positioned in the cooking utensil. Such an undesirable temperature differential may cause a portion of the one or more food items positioned in the cooking utensil to burn, while a remaining portion of the one or more food items remains uncooked.

Accordingly, a cooktop appliance with features for avoiding such undesired heating of a cooking utensil on the cooktop appliance would be useful. In particular, a cooktop appliance with features for managing a power output of heating elements of the cooktop appliance to avoid an undesirable temperature differential between a temperature of a cooking utensil and a temperature of one or more food items positioned within the cooking utensil would be particularly beneficial.

BRIEF DESCRIPTION OF THE INVENTION

Aspects and advantages of the invention will be set forth in part in the following description, or may be apparent from the description, or may be learned through practice of the invention.

In a first exemplary aspect of the present disclosure, a method for operating a cooktop appliance is provided. The method includes determining a temperature of a cooking utensil positioned on a heating element of the cooktop appliance, and determining a temperature of a food in the cooking utensil positioned on the heating element of the cooktop appliance. The method also includes calculating a temperature differential between the temperature of the cooking utensil and the temperature of the food in the cooking utensil. The method also includes controlling a heating temperature of the heating element to reduce the temperature differential when the temperature differential is greater than a predetermined threshold.

In an exemplary embodiment of the present disclosure, a cooktop appliance is provided. The cooktop appliance includes a heating element positioned on a cooktop surface of the cooktop appliance, and a controller operably connected to the heating element. The controller is configured to receive a signal from a cookware temperature sensor indicative of a temperature of a cooking utensil positioned on the heating element. The controller is also configured to receive a signal from a food temperature sensor indicative of a temperature of a food positioned in the cooking utensil positioned on the heating element. The controller is also configured to calculate a temperature differential between the temperature of the cooking utensil and the temperature of the food in the cooking utensil, and control a heating temperature of the heating element when the calculated temperature differential is greater than a predetermined threshold.

In another exemplary aspect of the present disclosure a method for associating a wireless sensor to a heating element of a cooktop appliance is provided. The method includes receiving a wireless signal from a wireless sensor configured with a cooking utensil with a first wireless receiver, the first wireless receiver associated with a first heating element in a plurality of heating elements of the cooktop appliance. The method also includes receiving a wireless signal from the wireless sensor configured with the cooking utensil with a second wireless receiver, the second wireless receiver associated with a second heating element in the plurality of heating elements. The method also includes comparing a strength of the wireless signal received with the first wireless receiver to a strength of the wireless signal received with the second wireless receiver. The method also includes determining a position of the cooking utensil on one of the first heating element or the second heating element based on the compared strengths of the wireless signals received with the first and second wireless receivers.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
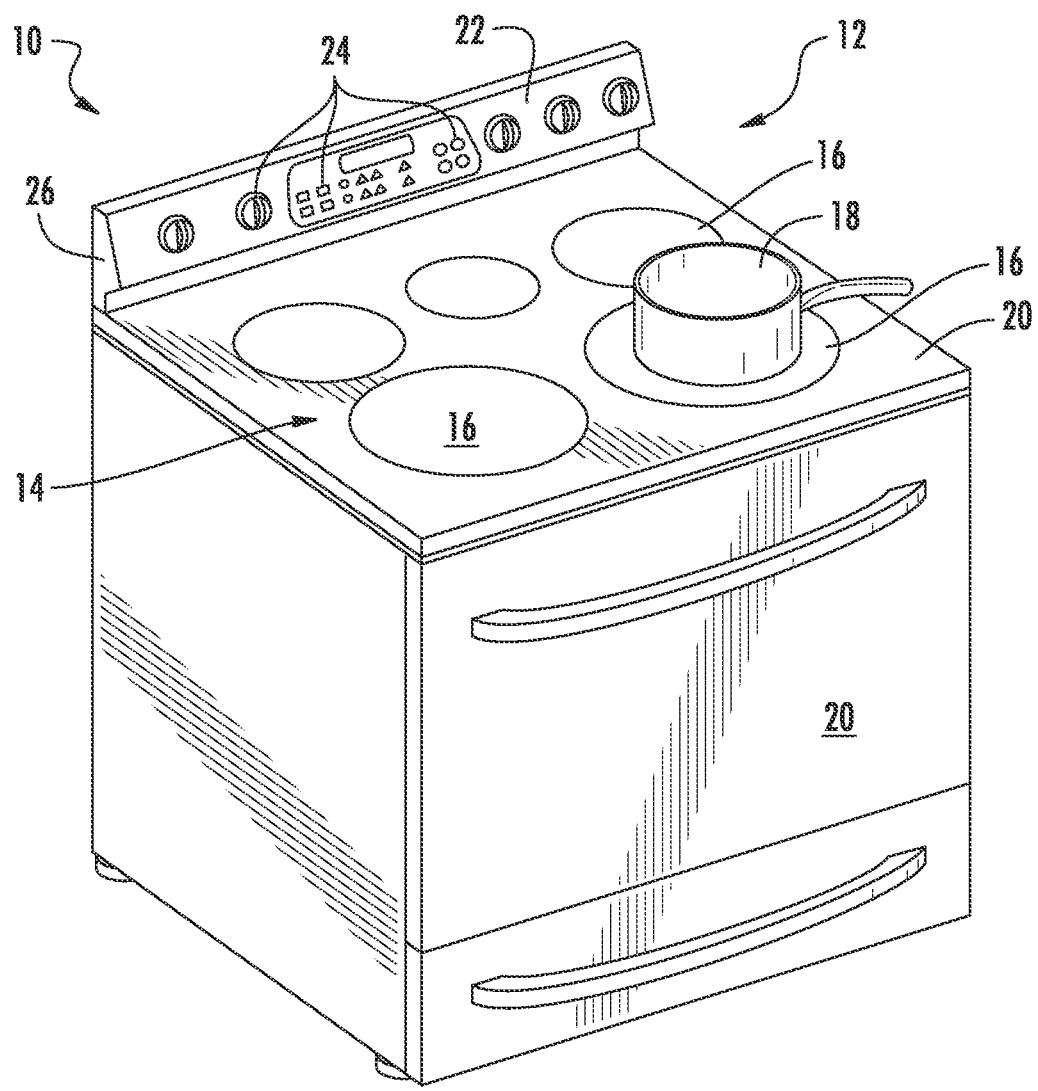
FIG. 1 provides a side, perspective view of a range having a cooktop appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a range appliance, or range 10, including a cooktop appliance 12. Range 10 is provided by way of example only and is not intended to limit the present subject matter to the arrangement shown in FIG. 1. Thus, the present subject matter may be used with other range 10 and/or cooktop appliance 12 configurations, e.g., double oven range appliances, standalone cooktop appliances, cooktop range appliances without an oven, etc.

A panel or cooking surface 14 of cooktop appliance 12 includes a plurality of heating elements 16. For the embodiment depicted, the cooktop appliance 12 includes five heating elements 16 spaced along cooking surface 14. In certain exemplary embodiments, cooktop appliance 12 may be a radiant cooktop appliance, and cooking surface 14 may be constructed of a glass, ceramic, or a combination glass-ceramic material, or any other suitable material. In such an embodiment, the heating elements 16 may be, e.g., electrical resistive heating elements. However, in other embodiments, the cooktop appliance 12 may include any other suitable shape, configuration, and/or number of heating elements 16. Additionally, in other embodiments, the cooktop appliance 12 may include any other suitable type of heating element 16, such as a gas burner heating element or induction heating element. Each of the heating elements 16 may be the same type of heating element 16, or cooktop appliance 12 may include a combination of different types of heating elements 16.

As shown in FIG. 1, a cooking utensil 18, such as a pot, pan, or the like, may be placed on a heating element 16 to heat the cooking utensil 18 and cook or heat food items placed in cooking utensil 18. Range appliance 10 also includes a door 20 that permits access to a cooking chamber (not shown) of range appliance 10, e.g., for cooking or baking of food items therein. A control panel 22 having controls 24 permits a user to make selections for cooking of food items. Although shown on a backsplash or back panel 26 of range appliance 10, control panel 22 may be positioned in any suitable location. Controls 24 may include buttons, knobs, and the like, as well as combinations thereof. As an example, a user may manipulate one or more controls 24 to select a temperature and/or a heat or power output for each heating element 16. The selected temperature or heat output of heating element 16 affects the heat transferred to cooking utensil 18 placed on heating element 16.

As will be discussed in greater detail below, the cooktop appliance 12 includes a control system 50 (FIG. 3) for controlling one or more of the plurality of heating elements 16. Specifically, the control system 50 may include a controller 52 (FIG. 3) operably connected to the control panel 22 and controls 24. The controller 52 may be operably connected to each of the plurality of heating elements 16 for controlling a power lever/heating temperature of each of the plurality of heating elements 16 in response to one or more user inputs received through the control panel 22 and controls 24.

Figure 2:
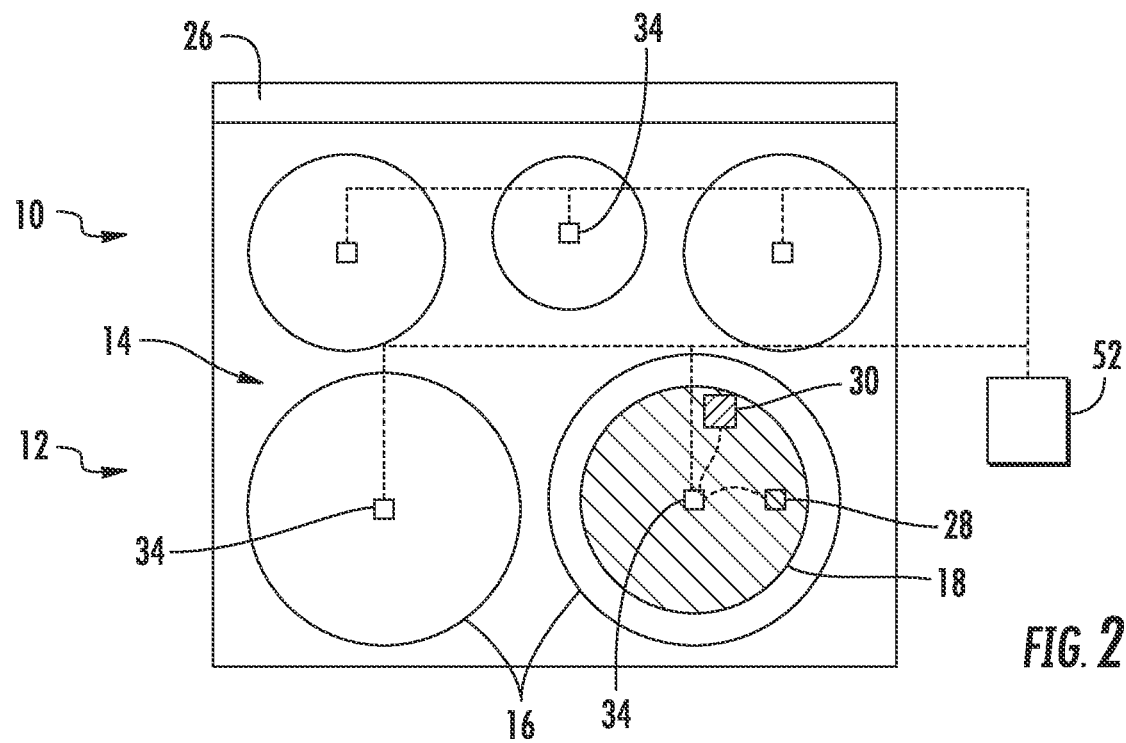
FIG. 2 provides a top, schematic view of the exemplary cooktop appliance of FIG. 1.

Referring now to FIG. 2, a top, schematic view of the cooktop appliance 12 of FIG. 1, or more specifically of the cooking surface 14 of the cooktop appliance 12 of FIG. 1 is provided. As stated, the cooking surface 14 of the cooktop appliance 12 for the embodiment depicted includes five heating elements 16 spaced along the cooking surface 14. A cooking utensil 18, also depicted schematically, is positioned on a first heating element 16 of the plurality of heating elements 16. For the embodiment depicted, a cookware temperature sensor 28 and a food temperature sensor 30 are also associated with the cooking utensil 18 (depicted in phantom).

In at least certain exemplary embodiments, the cookware temperature sensor 28 may be attached to or integrated into the cooking utensil 18 and configured to sense a temperature of, e.g., a bottom surface of the cooking utensil 18 or bottom wall of the cooking utensil 18. For example, the cookware temperature sensor 28 may be embedded within the bottom wall of the cooking utensil 18. Alternatively, however, the cookware temperature sensor 28 may be attached to or integrated within the cooking surface 14 of the cooktop appliance 12. With such an exemplary embodiment, the cookware temperature sensor 28 may be configured to physically contact the bottom surface of bottom wall of the cooking utensil 18 when the cooking utensil 18 is placed on the heating element 16 of the cooking surface 14. Alternatively, cookware temperature sensor 28 may be positioned proximate to the bottom surface or bottom wall of the cooking utensil 18 when the cooking utensil 18 is placed on the heating element 16 of the cooking surface 14.

Additionally, the food temperature sensor 30 may be positioned at any suitable location to sense a temperature of one or more food items 32 (see FIG. 3) positioned within the cooking utensil 18. For example, the food temperature sensor 30 may be a probe type temperature sensor configured to be inserted into one or more food items 32. Alternatively, however, the food temperature sensor 30 may be configured to determine a temperature of one or more food items positioned within the cooking utensil 18 in any other suitable manner.

In certain exemplary embodiments, one or both of the cookware temperature sensor 28 or food temperature sensor 30 may utilize any suitable technology for sensing/determining a temperature of the cooking utensil 18 or food 32 positioned in the cooking utensil 18, respectively. For example, one or both of the food temperature sensor 30 or cookware temperature sensor 28 may utilize one or more thermocouples, thermistors, optical temperature sensors, infrared temperature sensors, etc.

Referring still to FIG. 2, the cooktop appliance 12 additionally includes a plurality of receivers 34, each receiver 34 associated with an individual heating element 16. Each receiver 34 is configured to receive a signal from the food temperature sensor 30 indicative of a temperature of the one or more food items 32 positioned within the cooking utensil 18 and from the cookware temperature sensor 28 indicative of a temperature of the cooking utensil 18 positioned on a respective heating element 16. In at least certain exemplary embodiments, the cooking utensil 18 may have a wireless transmitter operably connected to one or both for the cookware temperature sensor 28 and food temperature sensor 30 to transmitting the signals to the receiver 34. Alternatively, however, one or both of the cookware temperature sensor 28 and food temperature sensor 30 may include transmitting capabilities, or alternatively may be hard-wired to the receiver 34 through a wired communications bus.

Figure 3:
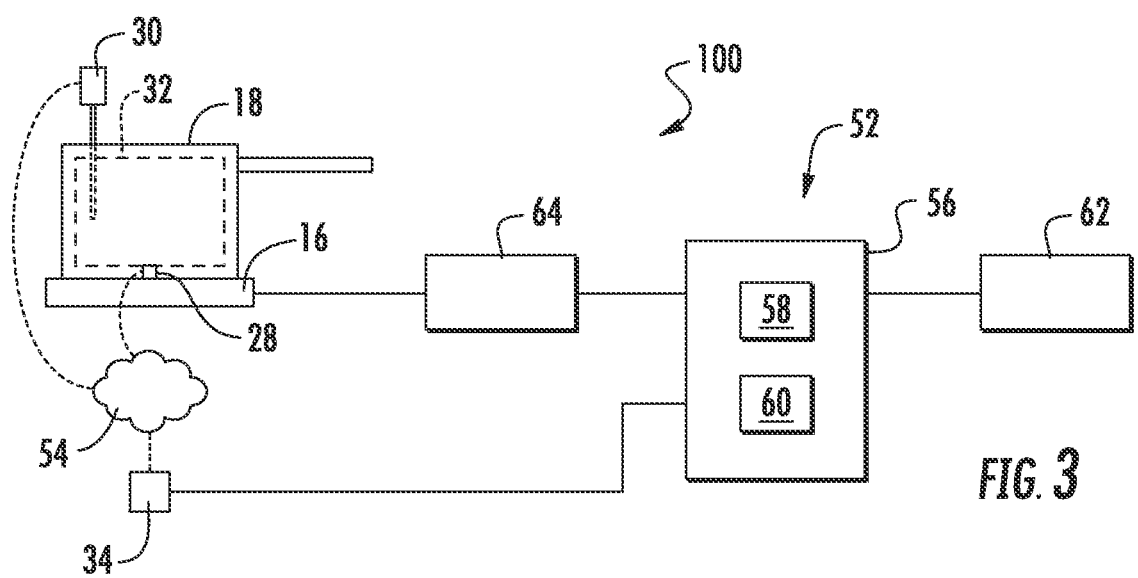
FIG. 3 provides a schematic diagram of a control system in accordance with an exemplary embodiment of the present disclosure as may be used with the exemplary cooktop appliance of FIG. 2.

Referring now also to FIG. 3, a schematic view of a system for operating a cooktop appliance 12 in accordance with an exemplary embodiment of the present disclosure is provided. Specifically, FIG. 3 provides a schematic view of a heating element 16 of the exemplary cooktop appliance 12 of FIGS. 1 and 2 and an exemplary control system 50.

As stated, the cooktop appliance 12 includes a receiver 34 associated with each heating element 16. For the embodiment depicted, each receiver 34 is positioned directly below a center portion of a respective heating element 16. Moreover, for the embodiment depicted, each receiver 34 is configured as a wireless receiver 34 configured to receive one or more wireless signals. Specifically, for the exemplary control system 50 depicted, each of the cookware temperature sensor 28 and the food temperature sensor 30 are configured as wireless sensors in wireless communication with the wireless receiver 34 via a wireless communications network 54. In certain exemplary embodiments, the wireless communications network 54 may be a wireless sensor network (such as a Bluetooth communication network), a wireless local area network (WLAN), a point-to point communication networks (such as radio frequency identification networks, near field communications networks, etc.), or a combination of two or more of the above communications networks.

Referring still to FIG. 3, each receiver 34 associated with a respective heating element 16 is operably connected to a controller 52 of the control system 50. The receivers 34 may be operably connected via a wired communication bus (as shown), or alternatively through a wireless communication network similar to the exemplary wireless communication network 54 discussed above. The controller 52 may generally include a computing device 56 having one or more processor(s) 58 and associated memory device(s) 60. The computing device 56 may be configured to perform a variety of computer-implemented functions to control the exemplary cooktop appliance 12. The computing device 56 can include a general purpose computer or a special purpose computer, or any other suitable computing device. It should be appreciated, that as used herein, the processor 58 may refer to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory 60 can store information accessible by processor(s) 58, including instructions that can be executed by processor(s) 58. For example, the instructions can be software or any set of instructions that when executed by the processor(s) 58, cause the processor(s) 58 to perform operations. For the embodiment depicted, the instructions may include a software package configured to operate the system to, e.g., execute the exemplary methods (100), (200) described below with reference to FIG. 4 and FIG. 5.

Referring still to FIG. 3, the control system 50 additionally includes a user interface 62 operably connected to the controller 52. For the embodiment depicted, the user interface 62 is configured in wired communication with the controller 52. However, in other exemplary embodiments, the user interface 62 may additionally, or alternatively, be wirelessly connected to the controller 52 via one or more suitable wireless communication networks (such as the exemplary wireless communication network 54 described above). In certain exemplary embodiments, user interface 62 may be configured as the control panel 22 and plurality of controls 24 on the cooktop appliance 12 (see FIG. 1). Additionally, or alternatively, the user interface 62 may be configured as an external computing device, such as a smart phone, tablet, or other device capable of connecting to the controller 52 of the exemplary control system 50.

Further, the controller 52 is operably connected to each of the plurality of heating elements 16 for controlling a power lever/heating temperature of each of the plurality of heating elements 16 in response to one or more user inputs through the user interface 62 (e.g., control panel 22 and controls 24). Specifically, for the embodiment depicted, the controller 52 is operably connected to a plurality of power level control devices 64, each power level control device 64 associated with a respective one of the heating elements 16. For example, wherein one or more of the heating elements 16 are configured as electric resistance heaters, the controller 52 may be operably connected to respective relays, triodes for alternating current, or other devices for controlling an amount of power to such electrical resistance heaters. Alternatively, wherein one or more of the heating elements 16 are configured as induction heating elements, the controller 52 may be operably connected to respective current control devices. Alternatively still, wherein one or more of the heating elements 16 are configured as gas burner heating elements, the controller 52 may be operably connected to one or more respective electronic or electromechanical gas valves.

Figure 4:
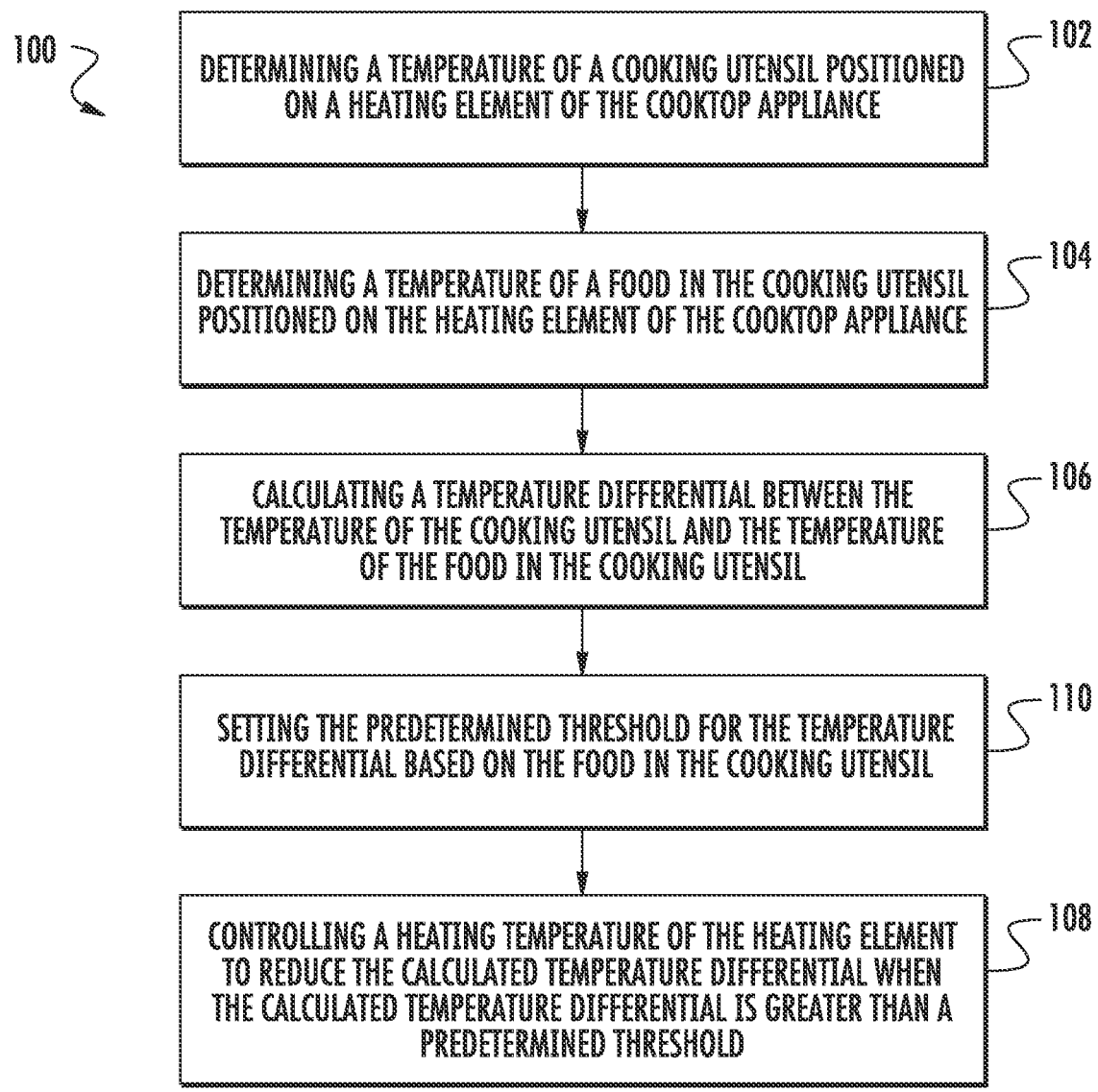
FIG. 4 provides a flow diagram of a method for operating a cooktop appliance in accordance with an exemplary aspect of the present disclosure.

Referring now to FIG. 4, a method (100) for operating a cooktop appliance in accordance with an exemplary aspect of the present disclosure is provided. The exemplary method (100) may be utilized with the exemplary cooktop appliance and control system described above with reference to FIGS. 1 through 3. Accordingly, the exemplary method (100) may be utilized with a cooktop appliance including a cooking surface having a plurality of heating elements positioned thereon configured for heating/cooking one or more food items positioned in respective cooking utensils.

The exemplary method (100) generally includes at (102) determining a temperature of a cooking utensil positioned on a heating element of the cooktop appliance, and at (104) determining a temperature of a food in the cooking utensil positioned on the heating element of the cooktop appliance. In certain exemplary aspects, determining at (102) the temperature of the utensil may include determining a temperature of a bottom surface of the cooking utensil, and/or may include sensing the temperature of the cooking utensil using, e.g., a cookware temperature sensor. Similarly, in certain exemplary aspects, determining at (104) the temperature of the food in the cooking utensil may include determining a temperature of a middle portion or top portion of such food, and/or may include sensing the temperature of the food in the cooking utensil using, e.g., a food temperature sensor.

Furthermore, in still other exemplary aspects, determining at (102) the temperature of the cooking utensil positioned on the heating element may include receiving with a wireless receiver a wireless signal from a cookware temperature sensor. Similarly, in other exemplary aspects, determining at (104) the temperature of the food in the cooking utensil may include receiving with a wireless receiver a wireless signal from a food temperature sensor.

Referring still to FIG. 4, the exemplary method (100) further includes at (106) calculating a temperature differential between the temperature of the cooking utensil determined at (102) and the temperature of the food in the cooking utensil determined at (104). Moreover, the exemplary method (100) includes at (108) controlling a heating temperature of the heating element to reduce the temperature differential calculated at (106) when the temperature differential calculated at (106) is greater than a predetermined threshold.

In at least certain exemplary aspects, controlling the heating temperature of the heating element at (108) may include reducing a power level of the heating element, and more specifically, may include reducing a power level of the heating element in an amount determined based on a magnitude of the temperature differential calculated at (106). Additionally, or alternatively, however, controlling a heating temperature of the heating element to reduce the temperature differential at (108) may include controlling a power level of the heating element using a proportional-integral-derivative control method.

The exemplary method (100) described herein may run automatically during operation of the cooktop appliance, or more specifically, of a heating element of the cooktop appliance. Additionally, or alternatively, the exemplary method (100) described herein may run automatically in response to receiving a temperature signal or signals from one or both of a cookware temperature sensor and/or a food temperature sensor. Alternatively still, the exemplary method (100) described herein may run in response to a user input to a user interface device.

Accordingly, such an exemplary method has the technical advantage of determining a temperature differential between a temperature of a cooking utensil and a temperature of a food positioned in the cooking utensil to keep the food from burning during cooking operations. Specifically, when the temperature differential is greater than a predetermined threshold indicative, e.g., of food burning on a bottom side contacting a bottom wall of the cooking utensil, while slowly heating in other areas, the method may control a power level/heating temperature of a respective heating element to minimize this effect. Therefore, a cooktop appliance operated according to the exemplary method of FIG. 4 may more gently heat/cook one or more food items positioned within a cooking utensil on a heating element of the cooktop appliance.

Notably, the predetermined threshold for when the food is burning on a bottom side (contacting a bottom wall of the cooking utensil) while slowly heating elsewhere may vary from food to food. Accordingly, in at least certain exemplary aspects, the exemplary method (100) may further include at (110) setting the predetermined threshold for the temperature differential based on the food in the cooking utensil. In certain exemplary aspects, setting the predetermined threshold for the temperature differential at (110) may include inputting a user input setting through a user input device to the control system of the cooktop appliance. In certain exemplary aspects, the user input setting inputted through the user input device may be, e.g., a food category or type of food positioned within the cooking utensil positioned on the heating element. Additionally, in certain exemplary aspects, the user input device may be a control panel on the cooktop appliance (including various controls), or alternatively, may be an external computing device, such as a handheld computing device, such as a smart phone or tablet, or any other suitable computing device capable of communicating with a controller of the control system.

Figure 5:
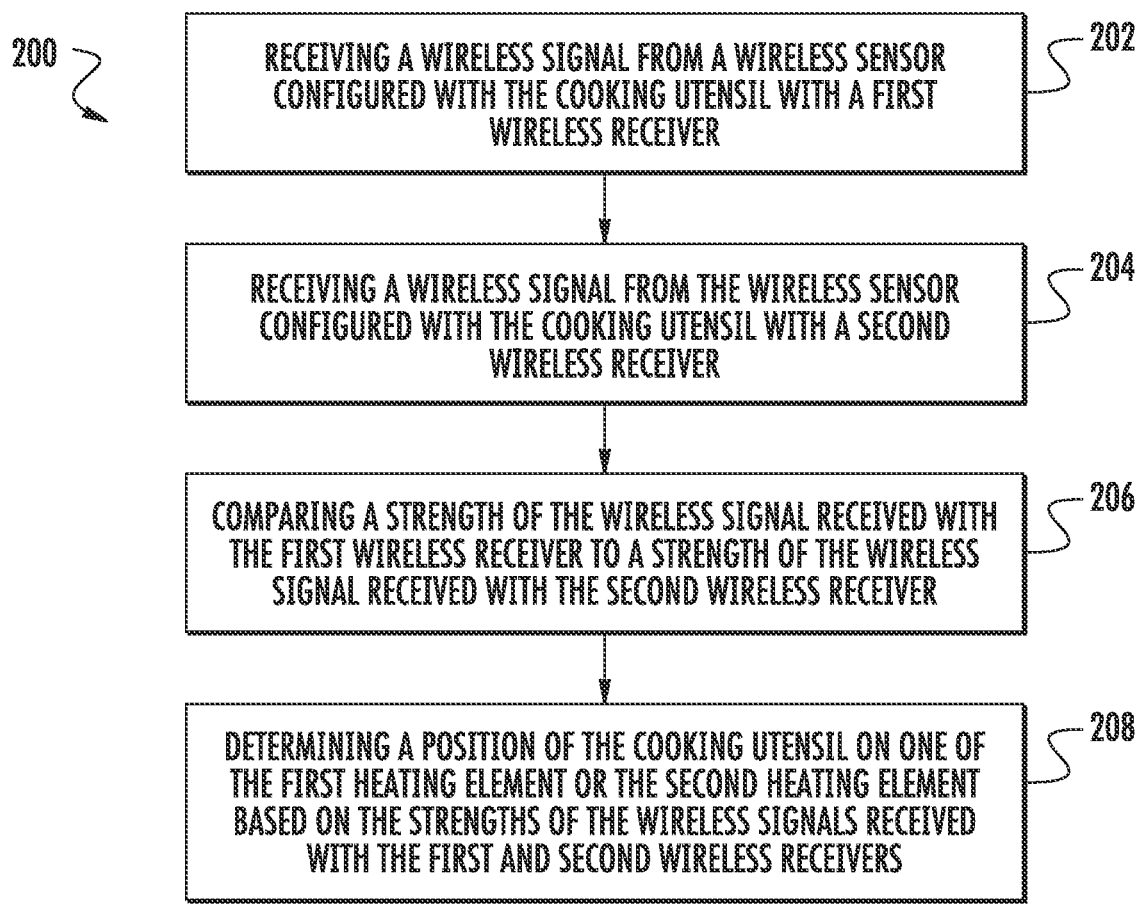
FIG. 5 provides a flow diagram of a method for associating a wireless sensor to a heating element of a cooktop appliance in accordance with an exemplary aspect of the present disclosure

Referring now to FIG. 5, an exemplary method (200) is provided for associating a wireless sensor to a heating element of a cooktop appliance. The exemplary method (200) of FIG. 5 may also be utilized with the exemplary cooktop appliance and control system described above with reference to FIGS. 1 through 3.

In certain exemplary aspects, the exemplary method (200) of FIG. 5 may allow for a user to place a cooking utensil having one or more wireless temperature sensors positioned therein or associated therewith on a single heating element of a plurality of heating elements of the cooktop appliance and have a control system of the cooktop appliance automatically determine a location of such cooking utensil.

For example, after the cooking utensil is placed on the heating element, the exemplary method (200) includes at (202) receiving with a first wireless receiver a wireless signal from a wireless sensor configured with the cooking utensil. The first wireless receiver may be associated with a first heating element of a plurality of heating elements of the cooktop appliance. Moreover, the exemplary method (200) additionally includes at (204) receiving with a second wireless receiver a wireless signal from the wireless sensor configured with the cooking utensil. The second wireless receiver may be associated with a second heating element of the plurality of heating elements of the cooktop appliance. Notably, in certain exemplary aspects, the wireless sensor configured with the cooking utensil may be a wireless food temperature sensor, a wireless cookware temperature sensor, or both.

Referring still to FIG. 5, the exemplary method (200) additionally includes at (206) comparing a strength of the wireless signal received with the first wireless receiver at (202) to a strength of the wireless signal received with the second wireless receiver at (204). For example, comparing at (206) the strength of the wireless signal received with the first wireless receiver at (202) to a strength of the wireless signal received with the second wireless receiver at (204) may include determining which of the two wireless signals is the strongest.

Additionally, the exemplary method (200) includes at (208) determining a position of the cooking utensil on one of the first heating element or the second heating element based on the strengths of the wireless signals received with the first and second wireless receivers and compared at (206). For example, determining at (208) a position of the cooking utensil on one of the first heating element or the second heating element based on the strengths of the wireless signals received with the first and second wireless receivers and compared at (206) may include determining the cooking utensil is positioned on the heating element associated with the wireless receiver receiving the strongest signal from the wireless temperature sensor.

Accordingly, a cooktop appliance including a control system incorporating the exemplary method (200) described above with respect to FIG. 5 includes the technical effect of allowing for a user to place a cooking utensil on a single heating element of a plurality of heating elements and automatically determining the relative position of the cooking utensil.

It should be appreciated, however, that the exemplary method (200) is provided by way of example only, and that in other exemplary embodiments, the method (200) may determine the relative position of the cooking utensil on the cooktop appliance in any other suitable manner. For example, in other exemplary aspects, the cooktop appliance may include at least three wireless receivers positioned at any suitable location within, e.g., the cooktop, a control panel of the cooktop, or at any suitable location. With such an exemplary aspect, the method (200) may include receiving a wireless signal from the wireless sensor configured with the cooking utensil with each of the three wireless receivers. The method (200) may determine a strength of the wireless signal received with each of the three wireless receivers. The method (200) may then determine the position of the cooking utensil by triangulating the wireless signals received by each of the three wireless sensors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a cooktop appliance, comprising:
    determining a temperature of a cooking utensil positioned on a heating element of the cooktop appliance with a cookware temperature sensor, wherein the cookware temperature sensor is attached to the cooking utensil, integrated into the cooking utensil, or contacting the cooking utensil;
    determining a temperature of a food in the cooking utensil positioned on the heating element of the cooktop appliance with a food temperature sensor;
    calculating a temperature differential between the temperature of the cooking utensil and the temperature of the food in the cooking utensil; and
    controlling a heating temperature of the heating element to reduce the temperature differential when the temperature differential is greater than a predetermined threshold.

2. The method of claim 1, further comprising
    setting the predetermined threshold for the temperature differential based on the food in the cooking utensil.

3. The method of claim 1, wherein determining the temperature of the cooking utensil includes determining a temperature of a bottom surface of the cooking utensil.

4. The method of claim 1, wherein determining the temperature of the cooking utensil includes sensing the temperature of the cooking utensil.

5. The method of claim 1, wherein determining the temperature of the food in the cooking utensil includes sensing the temperature of the food in the cooking utensil or receiving with a wireless receiver a wireless signal from the food temperature sensor.

6. The method of claim 1, wherein determining the temperature of the cooking utensil positioned on the heating element includes receiving with a wireless receiver a wireless signal from the cookware temperature sensor.

7. The method of claim 1, wherein controlling the heating temperature of the heating element includes reducing a power level of the heating element.

8. The method of claim 1, wherein controlling the heating temperature of the heating element includes reducing a power level of the heating element in an amount determined based on a magnitude of the temperature differential.

9. The method of claim 1, wherein controlling a heating temperature of the heating element to reduce the temperature differential when the temperature differential is greater than a predetermined threshold includes controlling a power level of the heating element using a proportional-integral-derivative control method.

10. The method of claim 1, wherein the cookware temperature sensor is attached to the cooking utensil or integrated into the cooking utensil.

11. The method of claim 1, wherein the cookware temperature sensor is integrated within the cooking surface of the cooktop appliance, and wherein the cookware temperature sensor is configured to physically contact a bottom surface of a bottom wall of the cooking utensil when the cooking utensil is placed on the heating element of the cooking surface.

12. A cooktop appliance comprising:
    a heating element positioned on a cooktop surface of the cooktop appliance; and
    a controller operably connected to the heating element, the controller configured to
    receive a signal from a cookware temperature sensor indicative of a temperature of a cooking utensil positioned on the heating element, wherein the cookware temperature sensor is attached to the cooking utensil, integrated into the cooking utensil, or contacting the cooking utensil when the cooking utensil is positioned on the cooktop surface;
    receive a signal from a food temperature sensor indicative of a temperature of a food positioned in the cooking utensil positioned on the heating element;
    calculate a temperature differential between the temperature of the cooking utensil and the temperature of the food in the cooking utensil; and
    control a heating temperature of the heating element to reduce the calculated temperature differential when the calculated temperature differential is greater than a predetermined threshold.

13. The cooktop appliance of claim 12, further comprising a wireless receiver operably connected to the controller, wherein the controller is configured to receive the signal from the cookware temperature sensor using the wireless receiver, and wherein the controller is configured to receive the signal from the food temperature sensor using the wireless receiver.

14. The cooktop appliance of claim 12, further comprising a user interface, wherein the controller is further configured to receive through the user interface a user input setting corresponding to a desired predetermined threshold for the temperature differential, and wherein the controller is further configured to set the predetermined threshold for the temperature differential based on the user input setting.

15. The cooktop appliance of claim 12, wherein in controlling the heating temperature of the heating element the controller is configured to reduce a power level of the heating element.

16. The cooktop appliance of claim 12, wherein in controlling the heating temperature of the heating element the controller is configured to reduce a power level of the heating element in an amount determined based on a magnitude of the temperature differential calculated.

17. The cooktop appliance of claim 12, wherein in controlling the heating temperature of the heating element the controller is configured to control a power level of the heating element using a proportional-integral-derivative control method.

18. The cooktop appliance of claim 12, wherein the cookware temperature sensor is attached to the cooking utensil or integrated into the cooking utensil.

19. The cooktop appliance of claim 12, wherein the cookware temperature sensor is integrated within the cooking surface of the cooktop appliance, and wherein the cookware temperature sensor is configured to physically contact a bottom surface of a bottom wall of the cooking utensil when the cooking utensil is placed on the heating element of the cooking surface.

* * * * *